US006903651B2

(12) United States Patent
Matsuoka

(10) Patent No.: US 6,903,651 B2
(45) Date of Patent: Jun. 7, 2005

(54) METHOD OF UNLOCKING ELECTRONIC LOCK

(75) Inventor: Kentaro Matsuoka, Machida (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 237 days.

(21) Appl. No.: 10/381,337

(22) PCT Filed: Jul. 31, 2001

(86) PCT No.: PCT/JP01/06591

§ 371 (c)(1),
(2), (4) Date: Mar. 25, 2003

(87) PCT Pub. No.: WO02/27126

PCT Pub. Date: Apr. 4, 2002

(65) Prior Publication Data

US 2004/0012484 A1 Jan. 22, 2004

(30) Foreign Application Priority Data

Sep. 26, 2000 (JP) ....................................... 2000-292932

(51) Int. Cl.$^{7}$ .................................................. H04B 1/00
(52) U.S. Cl. .................................. 340/5.61; 340/825.72
(58) Field of Search ............................... 340/5.61, 5.41, 340/5.24, 5.27, 5.1, 7.25, 438, 3.23, 825.53, 825.72; 455/7, 13.1

(56) References Cited

U.S. PATENT DOCUMENTS 4,918,431 A * 4/1990 Borras ........................ 340/7.25
5,635,900 A * 6/1997 Hasegawa et al. .......... 340/5.25
5,777,547 A * 7/1998 Waldrop ...................... 340/438
5,897,598 A * 4/1999 Puetz ......................... 340/5.27
6,795,920 B1 * 9/2004 Bacha et al. ................ 713/189

FOREIGN PATENT DOCUMENTS

| | | |
|---|---|---|
| JP | 60-128764 | 7/1985 |
| JP | 02-171893 | 7/1990 |
| JP | 05-233896 | 9/1993 |
| JP | 08-185578 | 7/1996 |

* cited by examiner

*Primary Examiner*—Michael Horabik
*Assistant Examiner*—William Bangachon
(74) *Attorney, Agent, or Firm*—Eric J. Robinson; Robinson Intellectual Property Law Office, P.C.

(57) ABSTRACT

A method of unlocking an electronic lock capable of saving a labor by unmanning a system on the side of an object to be unlocked and increasing a security, comprising the step of unlocking by using a radio and a plurality of identification codes, wherein a cashbox (10) transmits ID=A as ID1, a first electronic lock device (20) transmits ID=B as ID2 when receiving ID=A as ID, a second electronic lock device (30) transmits ID=C as ID3 when receiving ID=B as ID, and the cashbox (10) performs an unlocking operation when receiving ID=C as ID.

7 Claims, 6 Drawing Sheets

METHOD OF UNLOCKING ELECTRONIC LOCK

TECHNICAL FIELD

The present invention relates to an unlocking method of unlocking an object to be unlocked, for example a cashbox.

BACKGROUND ART

Conventional methods of unlocking a cashbox include, for example, a method disclosed in Japanese Patent Application Laid-Open No. 60-128764. This method is as follows. A person who receives money in a cashbox goes to the spot, and makes a call to a reception desk in a telephone office from a public phone. The person who receives money into a cashbox makes a telephone conversation with a receptionist at the reception desk, and during the telephone conversation, the person who receives money into a cashbox uses a push button dial to send an ID number, or passes a cipher by voice. Then, the receptionist at the reception desk checks the ID number or cipher, and if it is found to be authorized one, he or she sends a lock releasing command to the public phone and simultaneously invalidates this ID number or cipher to set a new ID number or cipher. The mechanism of a lock A of the public phone is released by this lock releasing command, and the person who receives money into a cashbox uses a duplicate key to release a lock B. In this way, the cashbox is unlocked.

However, the conventional unlocking method described above has a problem such that a full-service operator is required for unlocking a cashbox, thus making it impossible to achieve labor savings. In addition, one person can unlock the cashbox if he or she can know one ID number, and thus there is some limitation in ensuring security.

The present invention has been made in view of the above aspects, and the object thereof is to provide an unlocking method capable of achieving labor savings by unmanning a system on the side of an object to be unlocked, and ensuring high security.

The unlocking method of the present invention is characterized in that an object to be unlocked capable of sending/receiving an identification code by radio, and a plurality of electronic lock devices capable of sending/receiving identification codes by radio are provided, and a plurality of identification codes are used to perform an unlocking operation in the object to be unlocked.

In this unlocking method, the plurality of electronic lock devices send different identification codes repeatedly in a linked manner using as a starting identification code an identification code sent from the object to be unlocked if the received identification code is correct, and the object to be unlocked receives an identification code sent from the last electronic lock device, and undergoes the unlocking operation if the identification code is correct.

As another example, the plurality of electronic lock devices send different identification codes repeatedly in a linked manner using as a starting identification code an identification code sent from the object to be unlocked if the received identification code is correct, and the object to be unlocked receives the plurality of identification codes sent from the plurality of electronic lock devices, and undergoes the unlocking operation if the identification codes are correct.

As still another example, the plurality of electronic lock devices send different identification codes repeatedly in a linked manner using as a starting identification code an identification code sent from the object to be unlocked if the received identification code is correct and the owner of the electronic lock device is to be found an authorized owner from a detected biological feature, and the object to be unlocked receives an identification code sent from the last electronic lock device, and undergoes the unlocking operation if the identification code is correct.

BEST MODE FOR CARRYING OUT THE INVENTION

Figure 1:
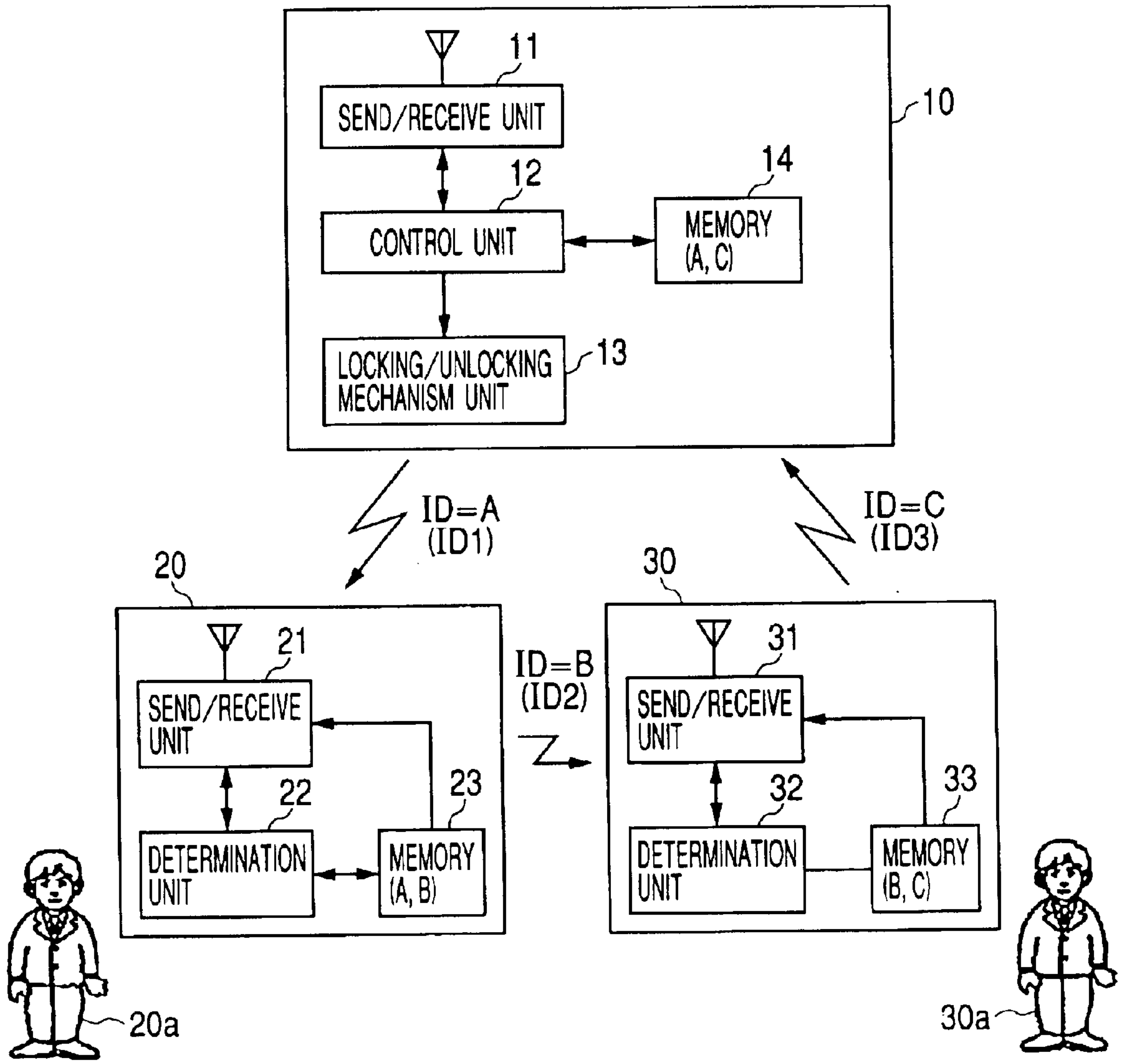
FIG. 1 is a block diagram showing a first cashbox apparatus for explaining the first embodiment of the unlocking method of the present invention.

The embodiment of the unlocking method according to the present invention will now be described in detail with reference to the attached drawings. FIG. 1 is a block diagram showing a first cashbox apparatus for explaining the first embodiment of the unlocking method of the present invention. The first cashbox apparatus consists of a cashbox 10, a first electronic lock device 20 and a second electronic lock device 30. The number of electronic lock devices can easily be increased or decreased according to the level of security, but two electronic lock devices are used in this embodiment.

The cashbox 10 has a send/receive unit 11, a control unit 12, a locking/unlocking mechanism unit 13 and a memory 14. "A" and "C" are stored in the memory 14 as identification codes (hereinafter referred to as ID). The cashbox 10 sends ID=A stored in the memory 14 constantly as ID1 from the send/receive unit 11. On the other hand, when the send/receive unit 11 receives an ID, and the ID is found to be "C" in the control unit 12 as a result of comparison with ID=C stored in the memory 14, the locking/unlocking mechanism unit 13 is operated by the control unit 12 to unlock the cashbox 10.

The first electronic lock device 20 is owned by a first unlocking person 20*a*. The first electronic lock device 20 has a send/receive unit 21, a determination unit 22 and a memory 23. "A" and "B" are stored as IDs in the memory 23. When the first electronic lock device 20 receives an ID at the send/receive unit 21, and it is determined by the determination unit 22 that the ID is "A" as a result of comparison with ID=A stored in the memory 23, then ID=B stored in the memory 23 is sent from the send/receive unit 21 as ID2. That is, the first electronic lock device 20 sends ID=B as ID2 when receiving an authorized ID (ID=A) from the cashbox 10.

The second electronic lock device 30 is owned by a second unlocking person 30*a*. The second electronic lock device 30 has a send/receive unit 31, a determination unit 32 and a memory 33 as in the case of the first electronic lock device 20, but "B" and "C" are stored as IDs in the memory 33. When the second electronic lock device 30 receives an ID at the send/receive unit 31, and it is determined by the determination unit 32 that the ID is "B" as a result of comparison with ID=B stored in the memory 33, then ID=C stored in the memory 33 is sent from the send/receive unit 31 as ID3. That is, the second electronic lock device 30 sends ID=C as ID3 when receiving an authorized ID (ID=B) from the first electronic lock device 20.

Furthermore, the send/receive units 11, 21 and 31 each perform communication by a near two-way radio communication system between a master (server) and a slave (client). For the frequency band, the ISM (2.4 GHz band) which requires no specific license and is capable of being used in common almost all over the world is used. In this radio communication system, terminal identification codes are individually assigned so that a specific terminal can be identified. The terminal identification number is stored in a nonvolatile memory so that it cannot be rewritten.

In addition, the radio communication system has a capability of detecting that a communication partner has entered a communication area before data communication is carried out. After the communication partner is detected, an object of connection is selected or whether the object of connection is suitable is determined, and connection processing (calling) is performed for carrying out data communication.

Provided that a part performing detection is a master, the master has detection and connection buttons. The user presses the detection button, whereby the master sends a detection signal and waits until a response signal is received. A part to be detected (slave) performs reception operations periodically for receiving the detection signal, and sends its terminal identification number as the response signal when receiving the detection signal.

When receiving the response signal successfully, the master displays the terminal identification number by providing, for example, an indicator or the like. If the user wants to make a connection, he or she selects an object of connection and presses the connection button, whereby the master launches connection processing to start data communication.

This example is to establish communications between the master and a plurality of slaves, and links made around the master.

When connection for communication is started, the master assigns a temporary address to the slave. The slave determines from the received address whether data is bound for the slave, and captures the data if it is bound for the slave, and abandons the data if it is not bound for the slave. Even while data communication is performed between the master and the slave, a slave can be added at any time by carrying out a terminal detection/connection procedure in the above communication area. In addition, the temporary address assigned to the slave can be abandoned at the time when data communication is completed. In this way, communications with numerous terminals can be performed by adding and releasing the slave repeatedly in a time-divided manner.

Figure 2:
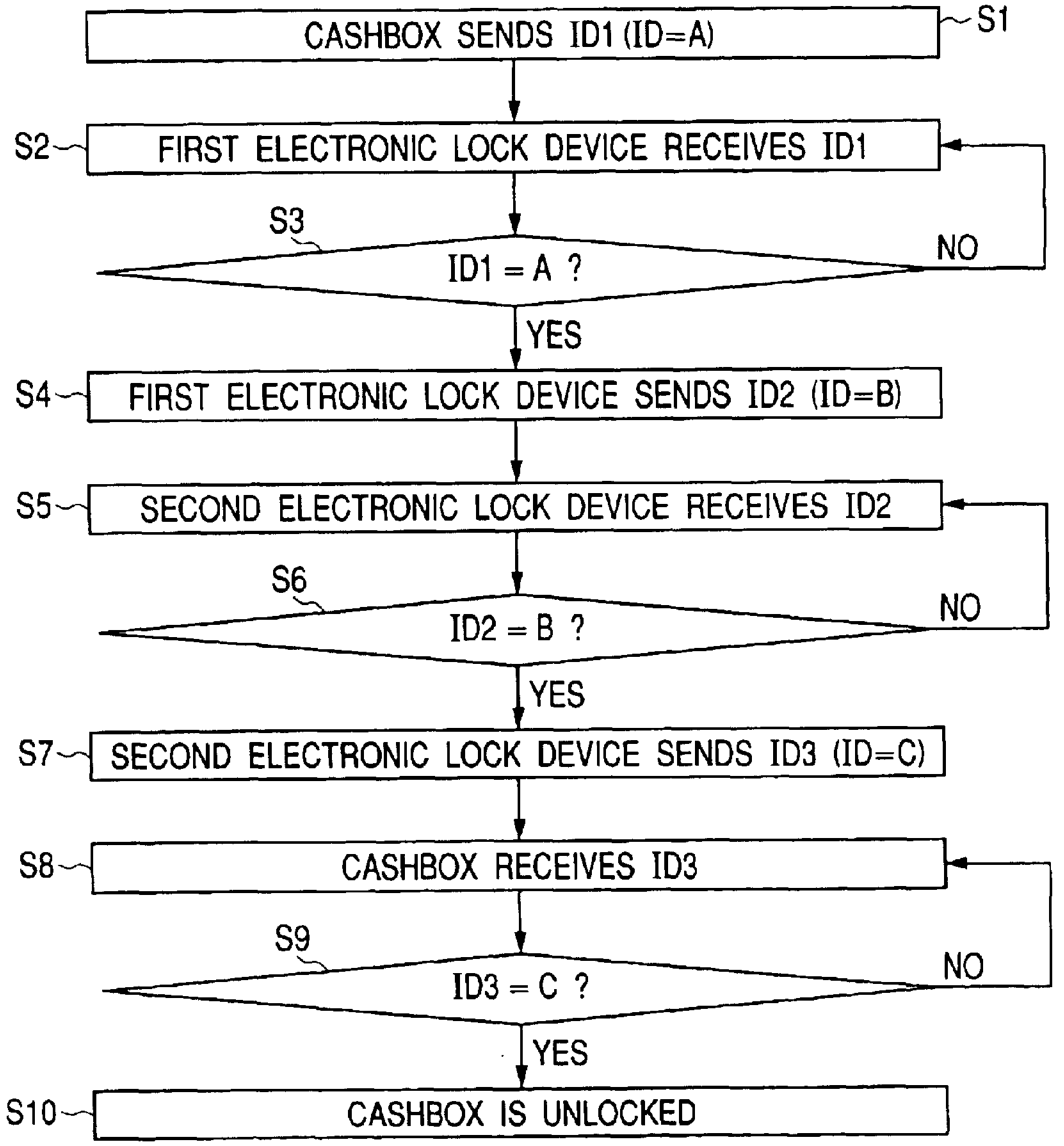
FIG. 2 is a flowchart showing in detail an unlocking operation in the first cashbox apparatus.

The unlocking operation of the cashbox 10 in this apparatus will now be described with reference to the flowchart of FIG. 2. The cashbox 10 sends ID=A constantly as ID1 (step S1). The first electronic lock device 20 receives this ID1 (step S2). Then, the first electronic lock device 20 determines whether the received ID1 is ID=A, namely the authorized ID from the cashbox 10 (step S3). If it is determined that the ID1 is ID=A, then the first electronic lock device 20 sends ID=B as ID2 (step S4). The second electronic lock device 30 receives this ID2 (step S5). Then, the second electronic lock device 30 determined whether the received ID2 is ID=B, namely authorized ID from the first electronic lock device 20 (step S6). If it is determined that the ID2 is ID=B, then the second electronic lock device sends ID=C as ID3 (step S7). The cashbox 10 receives this ID3 (step S8). Then, the cashbox 10 determines whether the received ID3 is ID=C, namely authorized ID from the electronic lock device 30 (step S9). If it is determined that the ID3 is ID=C, then the locking/unlocking unit 13 is operated by the control unit 12 to carry out unlocking in the cashbox 10 (step S10).

According to the above apparatus, as described above, the unlocking operation is performed in the cashbox 10 only when the first electronic lock device 20 and the second electronic lock device 30 owned by the first unlocking person 20*a* and the second unlocking person 30*a*, respectively, are used together along with a plurality of IDs, and as a result the IDs are sent and received correctly. Therefore, security is enhanced. In addition, the number of electronic lock devices can be increased and decreased according to the level of confidentiality, and thus an appropriate level of security can be maintained. In addition, the system on the side of the cashbox 10 can be unmanned, thus making it possible to achieve labor savings.

Figure 3:
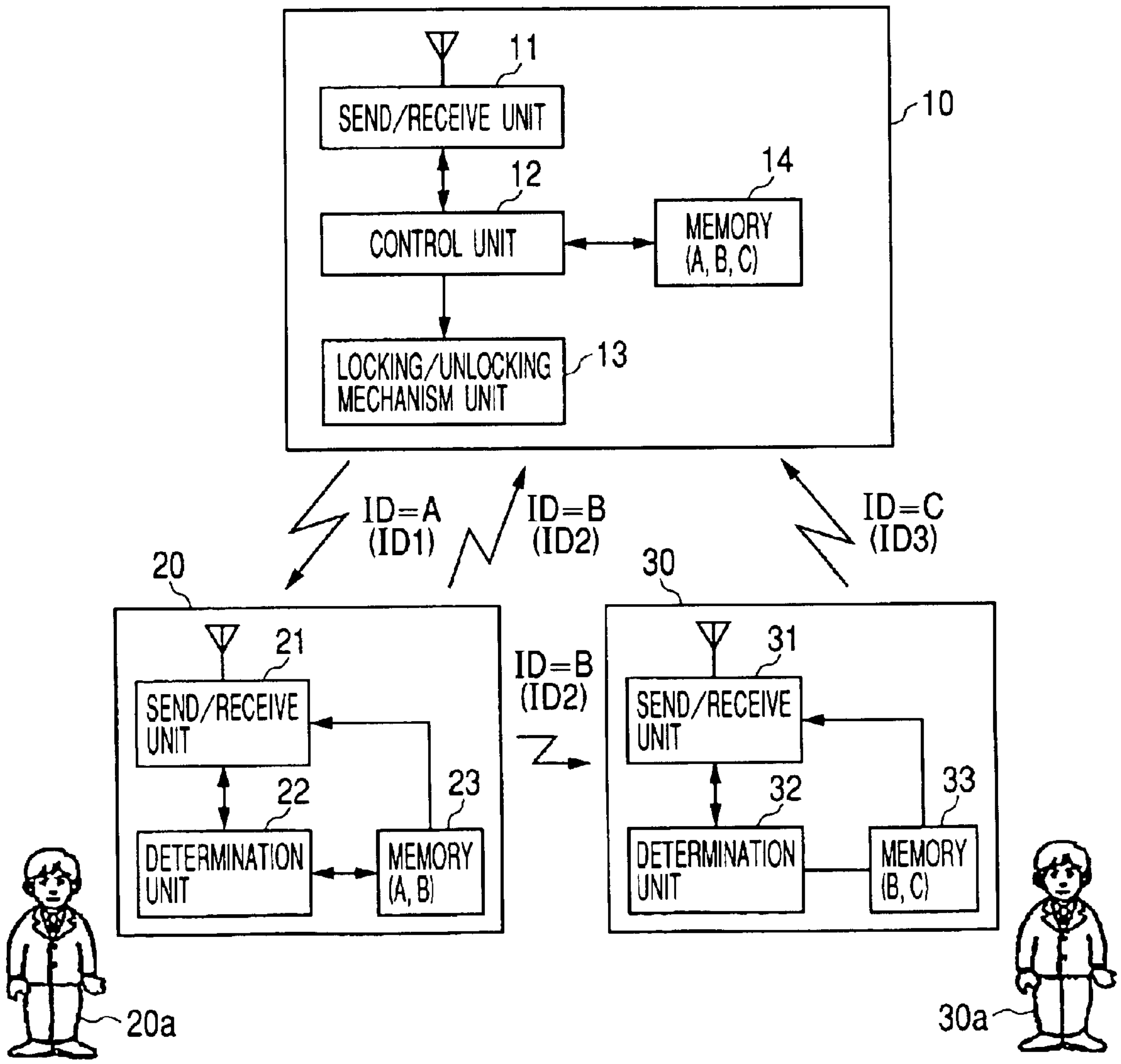
FIG. 3 is a block diagram showing a second cashbox apparatus for explaining the second embodiment of the unlocking method of the present invention.

FIG. 3 is a block diagram showing a second cashbox apparatus for explaining the second embodiment of the unlocking method of the present invention. In this second cashbox apparatus, the cashbox 10 receives both ID2 sent by the first electronic lock device 20 and ID3 sent by the second electronic lock device 30, and the locking/unlocking mechanism unit 13 is operated by the control unit 12 of the cashbox 10 to unlock the cashbox 10 when it is determined that the ID2 and ID3 are ID=B and ID=C, namely the cashbox 10 receives authorized IDs from both the first and second electronic lock devices 20 and 30. Other processes are carried out in the same way as the first cashbox apparatus of FIG. 1, and same parts in the figure are given same symbols as those in FIG. 1. Furthermore, IDs "B" and "C" for comparison are stored in the memory 14 of the cashbox 10 for determining whether ID2 and ID3 received from the first and second electronic lock devices 20 and 30 are "B" and "C".

Figure 4:
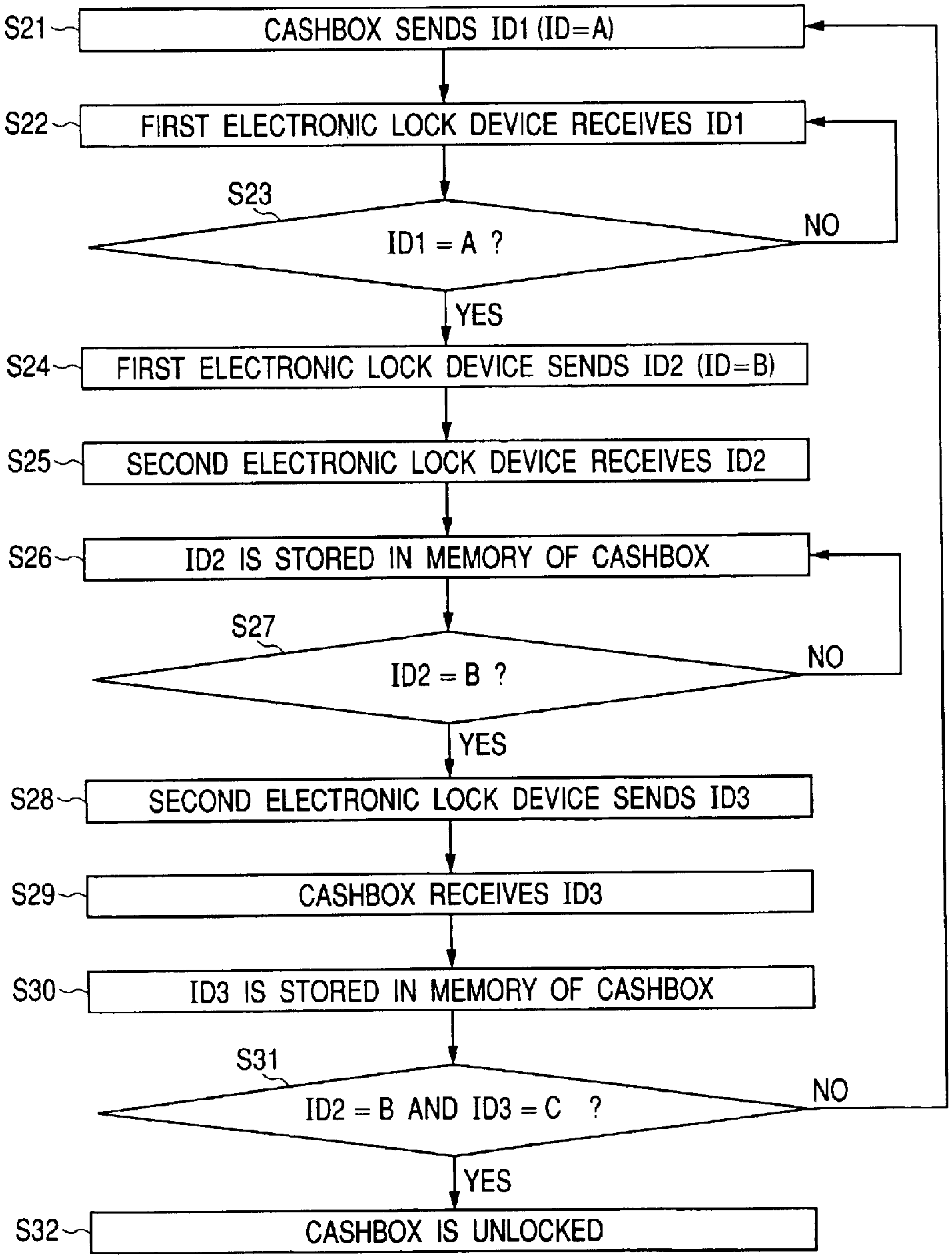
FIG. 4 is a flowchart showing in detail the unlocking operation in the second cashbox apparatus.

A detailed unlocking operation in the second cashbox apparatus is shown in the flowchart of FIG. 4. To explain this, the cashbox 10 sends ID=A constantly as ID1 (step S21). The first electronic lock device 20 receives the ID1 (step S22). Then, the first electronic lock device 20 determines whether the received ID1 is ID=A, namely an authorized ID from the cashbox 10 (step S23). If it is determined that the ID1 is ID=A, then the first electronic lock device 20 sends ID=B as ID2 (step S24). The second electronic lock device 30 receives the ID2 (step S25). At the same time, the ID2 is received by the cashbox 10, and is stored in the memory 14 of the cashbox 10 (step S26). The second electronic lock device 30 determines the received ID2 is ID=B, namely an authorized ID from the first electronic lock device 20 (step S27). If it is determined that the ID2 is ID=B, then the second electronic lock device 30 sends ID=C as ID3 (step S28). The cashbox 10 receives the ID3 (step S29), and stores the ID3 in the memory 14 of the cashbox 10 (step S30). At the same time, the cashbox 10 determines whether the ID3 stored in the memory 14 is ID=C, and the ID2 stored in the memory 14 at step S26 is ID=B, namely authorized IDs have been received from the first and second electronic lock devices 20 and 30 (step S31). If it is determined that the ID2 is ID=B, and the ID3 is ID=C, then the locking/ unlocking mechanism unit 13 is operated by the control unit 12 to perform unlocking in the cashbox 10 (step S32).

According to the second cashbox apparatus described above, the cashbox 10 receives IDs from both the first electronic lock device 20 and the second electronic lock device 30, thus making it possible to further enhance security.

Figure 5:
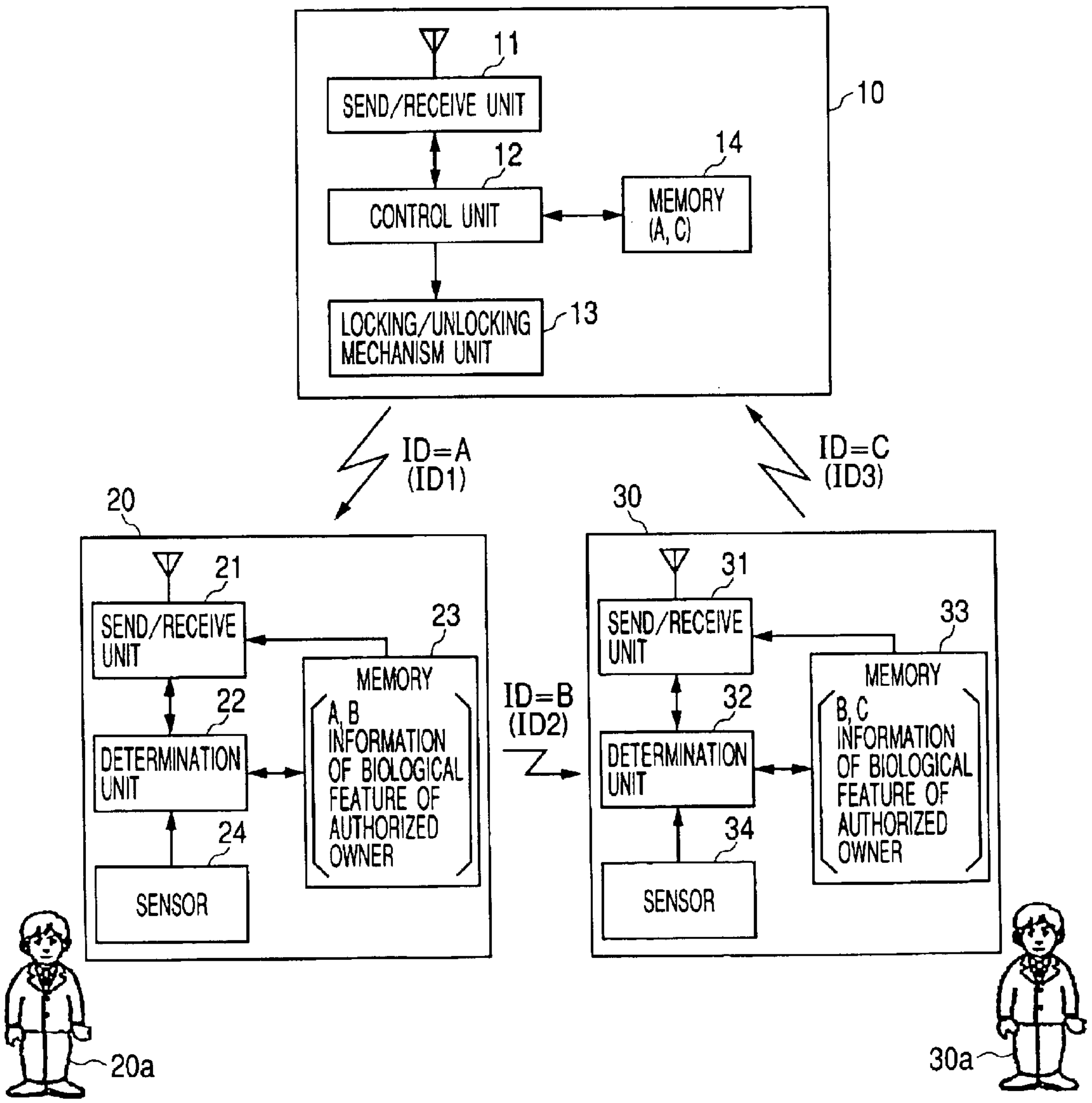
FIG. 5 is a block diagram showing a third cashbox apparatus for explaining the third embodiment of the unlocking method of the present invention.

FIG. 5 is a block diagram showing a third cashbox apparatus for explaining the third embodiment of the unlocking method of the present invention. In the third cashbox apparatus, sensors 24 and 34 are attached to the first electronic lock device 20 and the second electronic lock device 30, respectively. The sensor 24 attached to the first electronic lock device 20 detects a biological feature (e.g. fingerprint) of the owner of the first electronic lock device 20 to determine whether the owner of the first electronic lock device 20 is an authorized owner (first unlocking person 20*a*). Specifically, information obtained from the sensor 24 is compared with information of the biological feature of the authorized owner stored in the memory 23 in advance in the determination unit 22 to determine whether the owner of the first electronic lock device 20 is an authorized owner. When it is determined that the owner is an authorized owner in the way described above, and the received ID is an authorized ID (ID=A) from the cashbox 10, then the first electronic lock device 20 sends ID=B as ID2.

Similarly, the sensor 34 attached to the second electronic lock device 30 detects a biological feature (e.g. fingerprint) of the owner of the second electronic lock device 30 to determine whether the owner of the second electronic lock device 30 is an authorized owner (second unlocking person 30*a*). Specifically, information obtained from the sensor 34 is compared with information of the biological feature of the authorized owner stored in the memory 33 in advance in the determination unit 32 to determine whether the owner of the second electronic lock device 30 is an authorized owner. When it is determined that the owner is an authorized owner in the way described above, and the received ID is an authorized ID (ID=B) from the first electronic lock device 20, then the second electronic lock device 30 sends ID=C as ID3. Other configurations of the third cashbox are same as their counterparts of the first cashbox apparatus of FIG. 1, and the same parts in the figure are given same symbols as those of FIG. 1.

Figure 6:
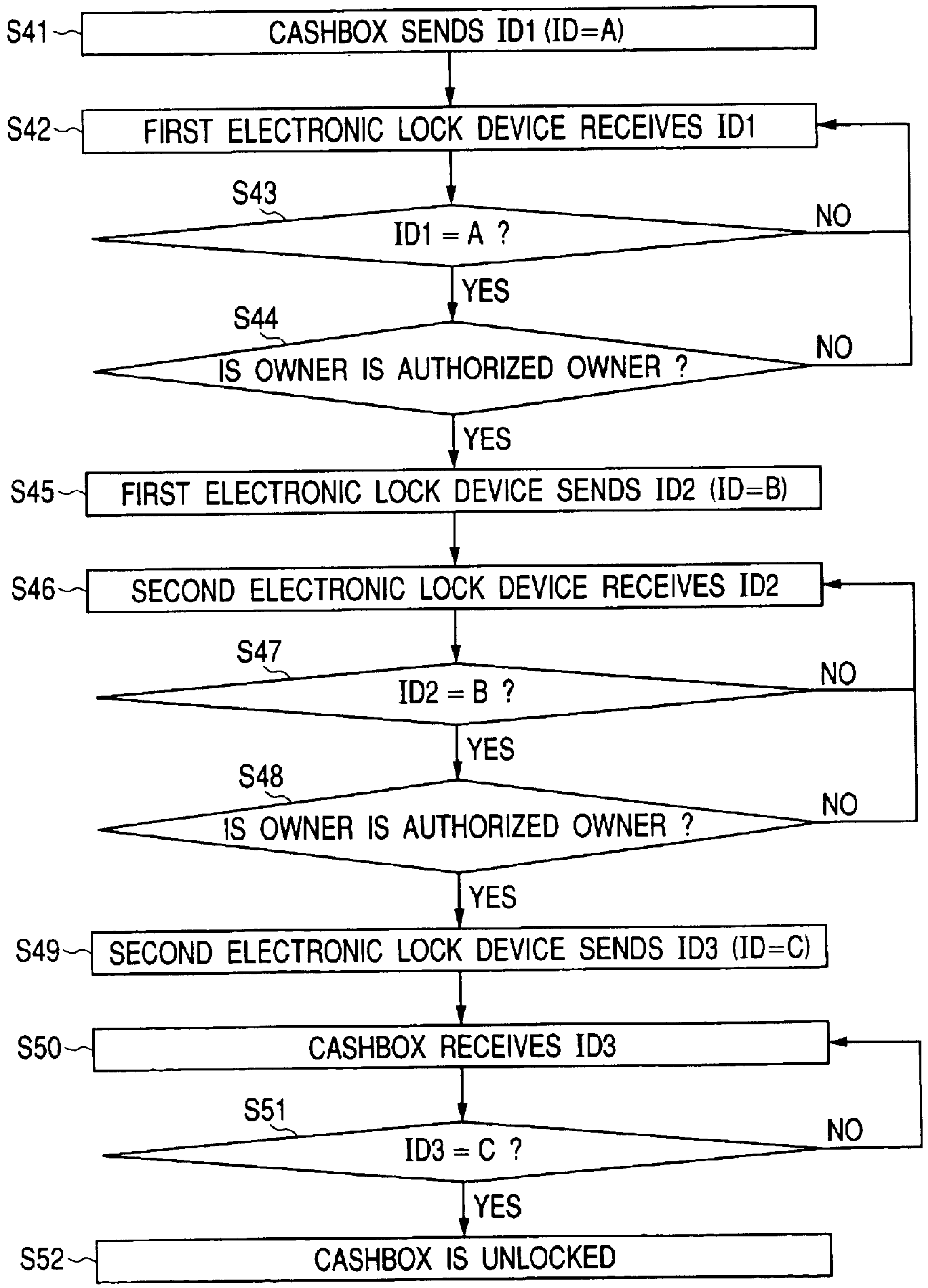
FIG. 6 is a flowchart showing in detail the unlocking operation in the third cashbox apparatus.

A detailed operation in the third cashbox apparatus is shown in the flowchart of FIG. 6. To explain this, the cashbox 10 sends ID=A constantly as ID1 (step S41). The first electronic lock device 20 receives the ID1 (step S42). Then, the first electronic lock device 20 determines whether the received ID1 is ID=A, namely an authorized ID from the cashbox 10 (step S43). If the ID1 is ID=A, then the first electronic lock device 20 further determines whether the owner is an authorized owner based on information from the sensor 24 (step S44). If it is determined that the owner is an authorized owner as well, then the first electronic lock device 20 sends ID=B as ID2 (step S45). The second electronic lock device 30 receives the ID2 (step S46). Then, the second electronic lock device 30 determines whether the received ID2 is ID=B, namely an authorized ID from the first electronic lock device 20 (step S47). If the ID2 is ID=B, then the second electronic lock device 30 further determines whether the owner is an authorized owner based on information from the sensor 34 (step S48). If it is determined that the owner is an authorized owner as well, then the second electronic lock device 30 sends ID=C as ID3 (step S49). The cashbox 10 receives the ID3 (step S50). Then, the cashbox 10 determines whether the received ID3 is ID=C, namely an authorized ID from the second electronic lock device 30 (step S51). If it is determined that the ID3 is ID=C, the locking/unlocking mechanism unit 13 is operated by the control unit 12 to perform unlocking in the cashbox 10 (step S52).

According to the third cashbox apparatus described above, whether the owner is an authorized owner is also determined by the first and second electronic lock devices 20 and 30 before the ID is sent from the first and second electronic lock devices 20 and 30, and therefore security is enhanced.

Furthermore, the case of unlocking a cashbox has been described in the above embodiments, but the unlocking method of the present invention may be used for unlocking other objects to be unlocked such as a gateway door as a matter of course.

According to the unlocking method of the present invention, as described above, the radio and a plurality of identification codes are used to perform unlocking, whereby the system on the side of the object to be unlocked can be unmanned to achieve labor savings, and also security can be enhanced.

What is claimed is:

1. A method used in an electronic lock system which comprises a locked object and a plurality of electronic lock devices, the locked object having a memory storing a first identification code and a second identification code and means for wirelessly transmitting and receiving the identification codes, and each electronic lock device having means for wirelessly transmitting and receiving the identification codes, the method performing an unlock operation on the locked object to be unlocked by using the identification codes, and comprising the steps of:

(a) when receiving the first identification code transmitted from the locked object in a starting one of the plurality of electronic lock devices, transmitting an identification code different from the received first identification code, from the starting electronic lock device to another electronic lock device, (b) when receiving the identification code transmitted from the starting electronic lock device in said another electronic lock device, transmitting an identification code different from the received identification code, from said another electronic lock device to another further electronic lock device, wherein the step (b) is repeated in a link manner from the starting electronic lock device to an ending electronic lock device through intermediate electronic lock devices, and (c) when receiving an identification code transmitted from the ending electronic lock device in the locked object and the received identification code is identical with the second identification code, unlocking the locked object.

2. A method used in an electronic lock system which comprises a locked object and a plurality of electronic lock devices, the locked object having means for wirelessly transmitting and receiving identification codes, and each electronic lock device having means for wirelessly transmitting and receiving identification codes, the method performing an unlock operation on the locked object to be unlocked by using the identification codes, and comprising the steps of:

(a) when receiving an identification code transmitted from the locked object in a starting one of the plurality of electronic lock devices, transmitting an identification code different from the received identification code, from the starting electronic lock device to another electronic lock device and the locked object, (b) when receiving the identification code transmitted from the starting electronic lock device in said another electronic lock device, transmitting an identification code different from the received identification code, from said another electronic lock device to another further electronic lock device and the locked object, wherein the step (b) is repeated in a link manner from the starting electronic lock to an ending electronic lock device through intermediate electronic lock devices, and (c) when receiving all the identification codes transmitted from the electronic lock devices in the locked object and all the identification codes are justified, unlocking the locked object.

3. An electronic lock system comprising an electronic cashbox having a send/receive unit, a memory storing first and (n+1)th IDs (n=2, 3, . . . ) and a locking/unlocking mechanism and first to nth electronic lock devices each of which has a send/receive unit, wherein the send/receive unit of the electronic cashbox sends a first ID, the send/receive unit of the first electronic lock device sends a second ID when receiving the first ID from the electronic cashbox, the send/receive unit of the nth electronic lock device sends an (n+1)th ID when receiving the nth ID, and the locking/unlocking mechanism is activated when the send/receive unit of the electronic cashbox receives the (n+1)th ID from the nth electronic lock device.

4. The electronic lock system according to claim 3, wherein the second ID is identical to the nth ID.

5. The electronic lock system according to claim 3, wherein the memory of the electronic cashbox stores the second ID, and the locking/unlocking mechanism is activated when the send/receive unit of the electronic cashbox receives both the second ID from the first electronic lock device and the (n+1)th ID from the nth electronic lock device.

6. The electronic lock system according to claim 3, wherein the first or nth electronic lock device has a sensor for detecting information specific to an owner of the electric lock device, the first or nth electronic lock device sends the second ID or the (n+1)th ID only when the information specific to the owner detected by the sensor is found to be justified as a result of checking the information.

7. The electronic lock system according to claim 3, further comprising second to (n−1)th electronic lock devices, wherein the second electronic lock device sends a third ID when receiving a second ID from the first electronic lock device, a third electronic lock device sends a fourth ID when receiving the third ID from the second electronic lock device, and an (n−1)th electronic lock device sends an nth ID when receiving an (n−1)th ID from the (n−2)nd electronic lock device.

* * * * *